(12) United States Patent
Melkonian et al.

(10) Patent No.: US 12,194,395 B1
(45) Date of Patent: Jan. 14, 2025

(54) REPLACEABLE FILTER CARTRIDGE ASSEMBLY

(71) Applicant: Brio Water Technology, Inc., City of Industry, CA (US)

(72) Inventors: Arman Melkonian, La Cañada Flintridge, CA (US); Mark Melkonian, Northridge, CA (US); Ravi Sawhney, Malibu, CA (US); Craig Steele, Manhattan Beach, CA (US); Samaykumar Patel, Santa Clarita, CA (US); Michael Kulick, Simi Valley, CA (US)

(73) Assignee: Brio Water Technology, Inc., City of Industry, CA (US)

( * ) Notice: Subject to any disclaimer, the term of this patent is extended or adjusted under 35 U.S.C. 154(b) by 0 days.

(21) Appl. No.: 18/581,105

(22) Filed: Feb. 19, 2024

(51) Int. Cl.
  *B01D 27/08* (2006.01)
  *B01D 29/96* (2006.01)
(52) U.S. Cl.
  CPC ............ *B01D 27/08* (2013.01); *B01D 29/96* (2013.01); *B01D 2201/4023* (2013.01); *B01D 2221/02* (2013.01)

(58) Field of Classification Search
  CPC .................... B01D 27/08; B01D 29/96; B01D 2201/4023; B01D 2221/02; B01D 35/30; B01D 2201/29; B01D 2201/30; B01D 2201/307; B01D 35/303; B01D 35/153
  USPC ....... 210/237, 232, 238, 282, 281, 455, 470, 210/465
  See application file for complete search history.

(56) References Cited

U.S. PATENT DOCUMENTS

2019/0039004 A1\* 2/2019 Zhang ..................... C02F 1/003

\* cited by examiner

*Primary Examiner* — Madeline Gonzalez
(74) *Attorney, Agent, or Firm* — Foundation Law Group LLP (57) ABSTRACT

A replaceable cartridge filtration assembly for a water dispenser that has a replaceable filter cartridge that can easily installed or removed by a technician or a user of the water dispenser. The replaceable filter cartridge has a handle with locking extensions that engage notches formed in the cartridge housing that the replaceable filter cartridge fits into to lock the replaceable filter cartridge in place.

7 Claims, 15 Drawing Sheets

FIG. 10B

REPLACEABLE FILTER CARTRIDGE ASSEMBLY

BACKGROUND

A water dispenser typically has a series of filters that the incoming water passes through before the water is dispensed to the consumer. These filters can be sediment filters, carbon filters, reverse osmosis filters or any other filter the consumer of the water wants to use to make the water taste better, remove sediment or purify the output water. These types of filter systems have had replaceable cartridge systems for years. The replaceable cartridges of these systems, though, are difficult to replace. They usually are in hard-to-reach places in the dispenser; behind other components and use cumbersome screw-in threading for the engagement between components.

Some systems have sought to address some of the issues with these older, more traditional replaceable cartridge filter systems. The assembly discussed in patent publication US 2019/0039004 is one such attempt. Systems such as this, though, still have significant drawbacks. In such systems, the replaceable cartridge is separate from the locking mechanism of the filter housing. Because of this, the inlet and outlet ports of the replacement cartridge do not always align properly with the inlet and outlet ports of the filter housing when the replacement cartridge is inserted into the filter housing. When the cartridge and housing are misaligned, the locking mechanism cannot engage the cartridge cover correctly, and the cartridge cover cannot be closed. As a result, the technician, or the user replacing the cartridge, must remove the replacement cartridge and start the process all over again. Or, if somehow, the technician or user can force the cartridge cover closed, this creates an unfortunate situation where the seals of the cartridge and housing inlet and outlet ports are not properly aligned, which will cause the dispenser to leak when used. Also, by forcing the cartridge cover closed, components of the cartridge or housing may get cracked.

Further, cartridges in such systems like US 2019/0039004 can still be difficult to remove and require unnecessary steps for removal and replacement of the cartridge. In such systems, to remove a cartridge, the technician or user has to first unlatch the cartridge cover connected to the housing. The user then rotates the cartridge cover upward, giving access to the replaceable cartridge. The technician or user then needs to grab a handle connected to the replaceable cartridge to pull the cartridge from the housing. This entire process requires dexterity on the part of the technician or user, especially if they have larger hands, and makes removing and replacing a cartridge more difficult and time consuming than it should be.

Accordingly, there is a need for a replaceable filter cartridge assembly that makes it easier for a user to remove and replace a filtration cartridge. There is also a further need for a replaceable filter cartridge assembly that makes alignment of the inlet and outlet ports of the cartridge and housing during installation of the cartridge easier and more reliable.

SUMMARY

According to one aspect of the present invention, a replaceable filter cartridge for use in a filter assembly of a fluid dispenser may include a filter housing having an integrated rotatable handle, an inlet port and an outlet port; where the rotatable handle has a locking extension formed integral with an end of the rotatable handle.

According to another aspect of the present invention, a filter cartridge housing for use in a filter assembly of a fluid dispenser may include a housing shell defining a cavity and having a pair of sidewalls where a filtration cartridge locking notch is formed in one of the sidewalls.

According to yet another aspect of the present invention, a replaceable cartridge filter assembly of a fluid dispenser may include a replaceable filter cartridge having a filter housing; a pair of pivot connectors; a rotatable handle having a locking extension formed in an end of the rotatable handle, and the rotatable handle being connected to the filter housing by the pair of pivot connectors, where the rotatable handle has a first portion disposed on one side of the pair of pivot connectors; where a locking extension is formed integral with an end of the rotatable handle disposed on an opposite side of one of the pair of pivot connectors. This aspect of the present invention may further include a filter cartridge housing defining a cavity having a pair of sidewalls where a locking notch is formed in one of the pair sidewalls; a handle locking latch connected to the sidewalls opposite the end of the sidewalls where the locking notch is formed; and where the replaceable cartridge filter assembly has an assembled and an unassembled configuration, where, in an assembled configuration, the replaceable filter cartridge sits within the cavity of the filter cartridge housing; the rotatable handle has been rotated to insert the locking extension into the locking notch formed in one of the pair of sidewalls of the filter cartridge housing; and the handle locking latch is engaged with the first portion of the rotatable handle to lock the replaceable filter cartridge into the filter cartridge housing.

DRAWINGS

Objects, features, and advantages of the present invention will become apparent upon reading the following description in conjunction with the drawing figures, in which.

DESCRIPTION

Figure 1:
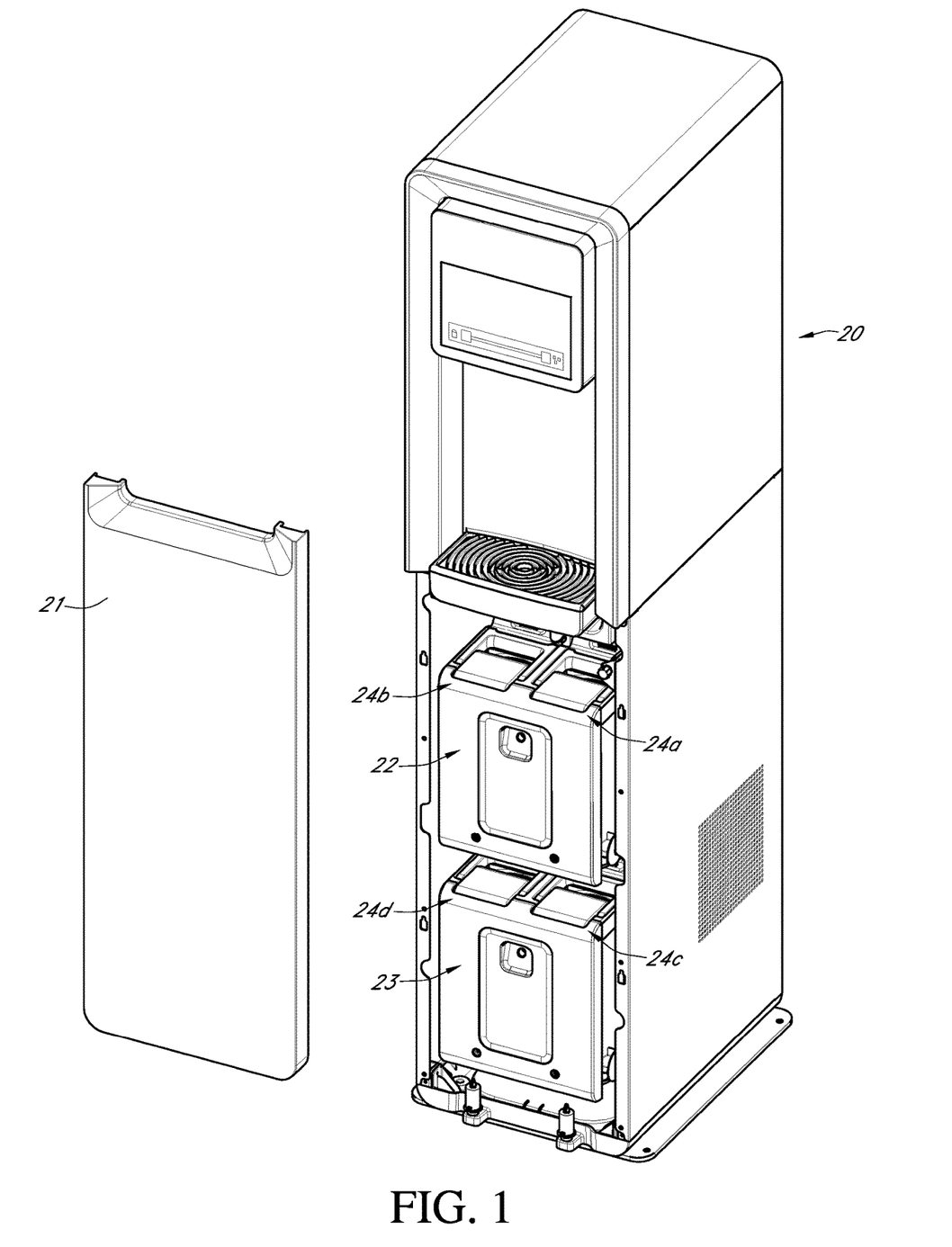
FIG. 1 is a front perspective view of a water dispenser depicting an embodiment of several replaceable cartridge filtration assemblies of the present invention installed in filtration racks of the water dispenser.
Figure 2A:
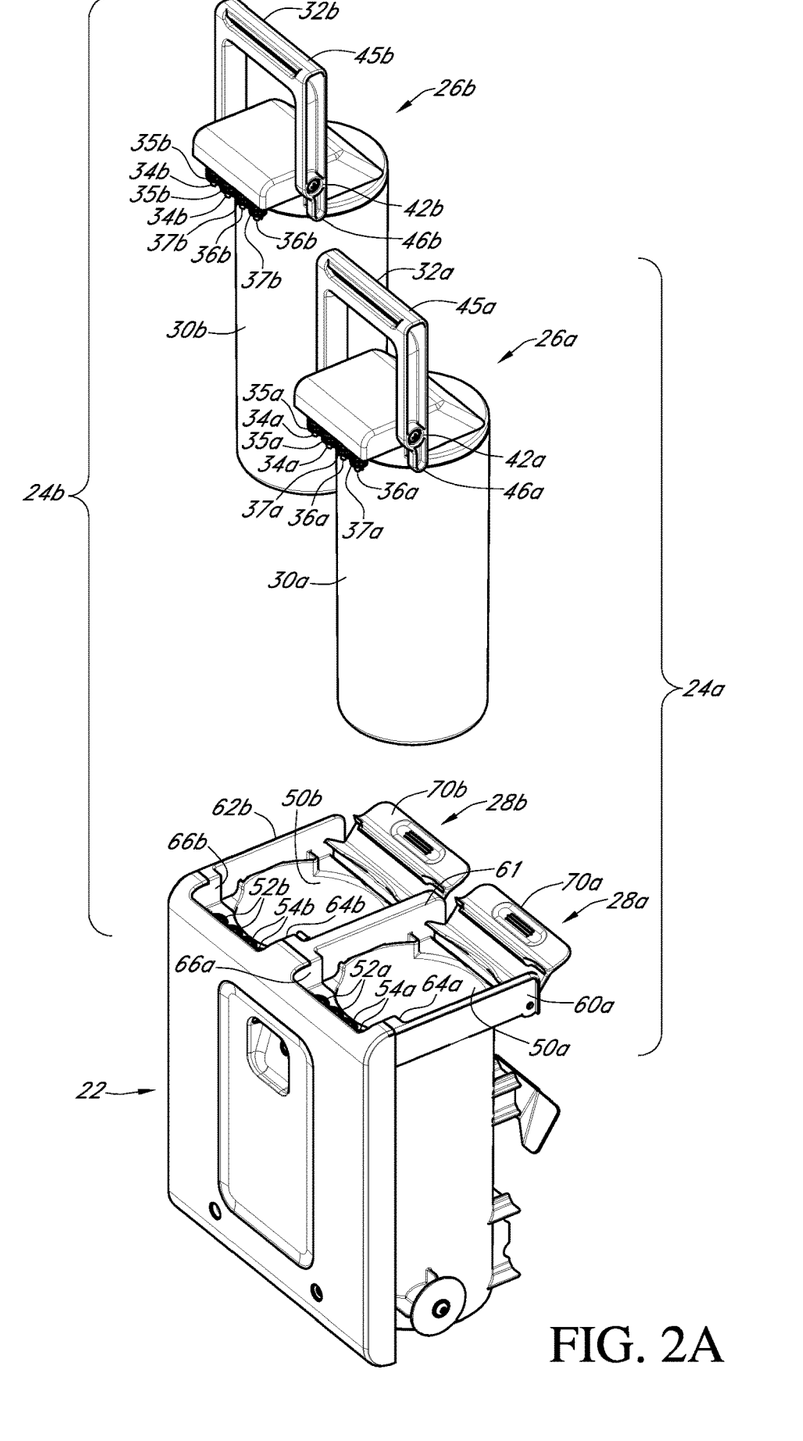
FIG. 2A depicts a filtration rack removed from the water dispenser with an exploded view of an embodiment of a pair of replaceable cartridge filtration assemblies of the present invention.
Figure 2B:
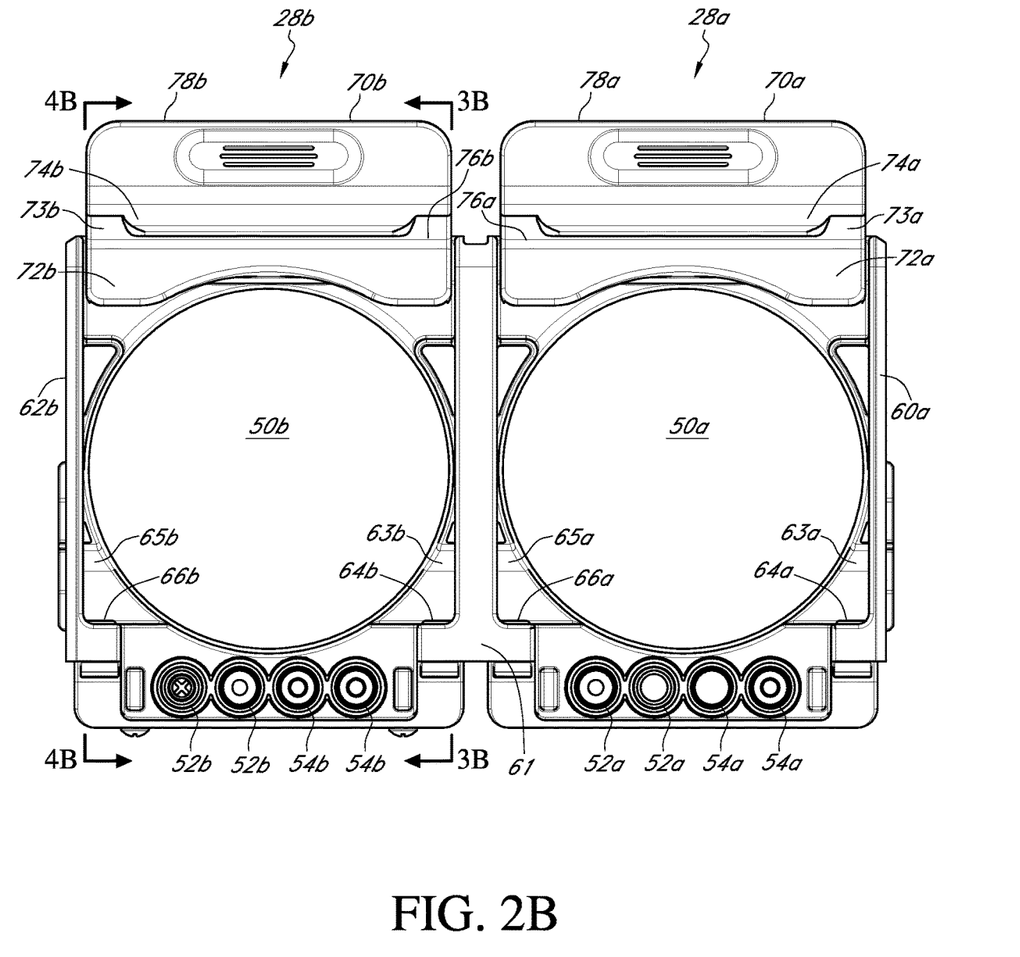
FIG. 2B is a top view of a filtration rack illustrating an embodiment of a pair of filter cartridge housings of the present invention.

Referring to FIG. 1, an exemplary water dispenser 20, with its filter access door 21 removed, is depicted. In this exemplary water dispenser 20, the water dispenser 20 has two filtration racks 22, 23. Filtration rack 22 contains a pair of replaceable cartridge filtration assemblies 24a, 24b of the present invention. Filtration rack 23 has components similar to filtration rack 22, and such components are identified similarly (e.g 24c, 24d). Referring now to FIGS. 2A-2B, the replaceable cartridge filtration assembly 24a of the present invention includes a replaceable filter cartridge 26a and a filter cartridge housing 28a. In use, as explained in detail below, the replaceable filter cartridge 26a is seated in the filter cartridge housing 28a to filter fluid. It should be understood that any replaceable cartridge filtration assembly 24 described herein has the same components as replaceable cartridge filtration assembly 24a and functions in the same way (i.e. 24b, 24c, 24d).

Figure 3A:
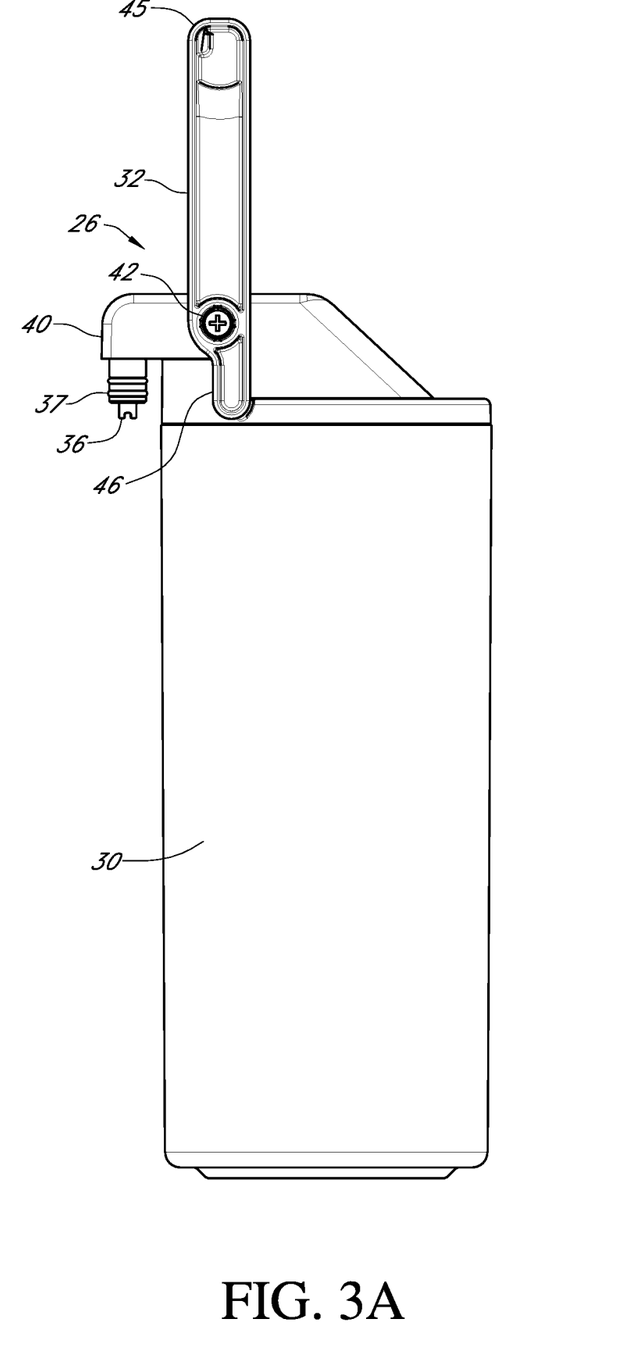
FIG. 3A is a right side view of an embodiment of the replaceable filter cartridge of the present invention.
Figure 4A:
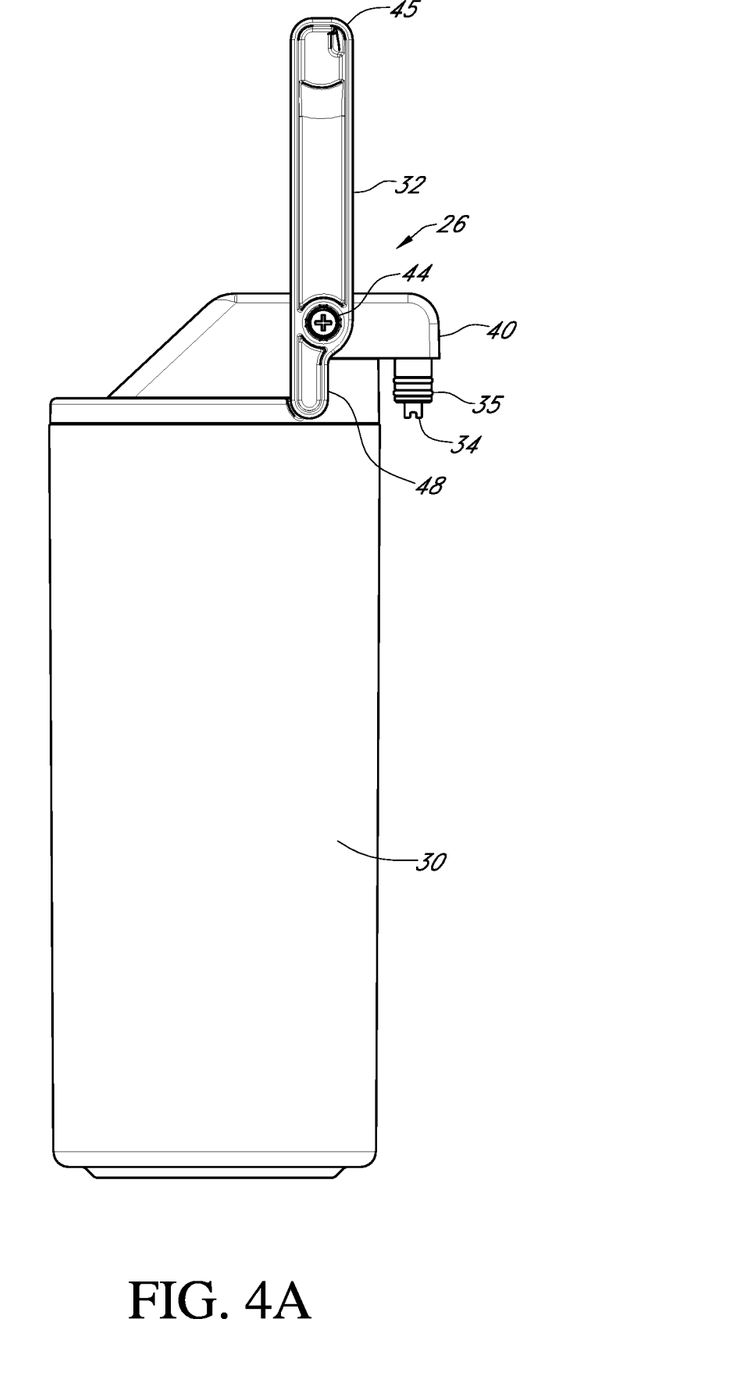
FIG. 4A is a left side view of an embodiment of the replaceable filter cartridge of the present invention.

FIGS. 3A, 4A depict an embodiment of a replaceable filter cartridge 26 of the present invention. In this embodiment, the replaceable filter cartridge 26 includes a filter housing 30 having a cover piece 40; a handle 32 rotatably connected to the cover piece 40 at a pair of pivot connectors 42, 44; a pair of inlet ports 34 and a pair of outlet ports 36. Each inlet port 34 includes a seal 35, and each outlet port 36 has a seal 37 as well. In this embodiment of the present invention, the seals 35, 37 are O-rings. The replaceable filter cartridge 26 also includes a filter element (not shown) that sits inside the filter housing 30. In this embodiment, the rotatable handle 32 has a first portion 45 that is U-shaped that extends between the two pivot connectors 42, 44. The handle 32 also includes a first locking extension portion 46 (FIG. 3A) that is formed integral with the first portion 45 of the handle 32 around the pivot connector 42. In this embodiment, the handle 32 also includes a second locking extension portion 48 (FIG. 4A) that is also formed integral with the first portion 45 of the handle 32 around the pivot connector 44. It should also be understood that any water dispenser 20 using the replaceable cartridge filtration assemblies 24 of the present invention may utilize any number of replaceable cartridge filtration assemblies 24, as needed, in as many filtration racks 22, as needed. In the embodiment depicted, the filter cartridge housings 28a, 28b, 28c, 28d are formed integral with the filter racks 22, 23. In other embodiments, the filter cartridge housings 28a, 28b, 28c, 28d may be formed so that they are separable or separate from their respective filter racks 22, 23 and from each other.

Figure 3B:
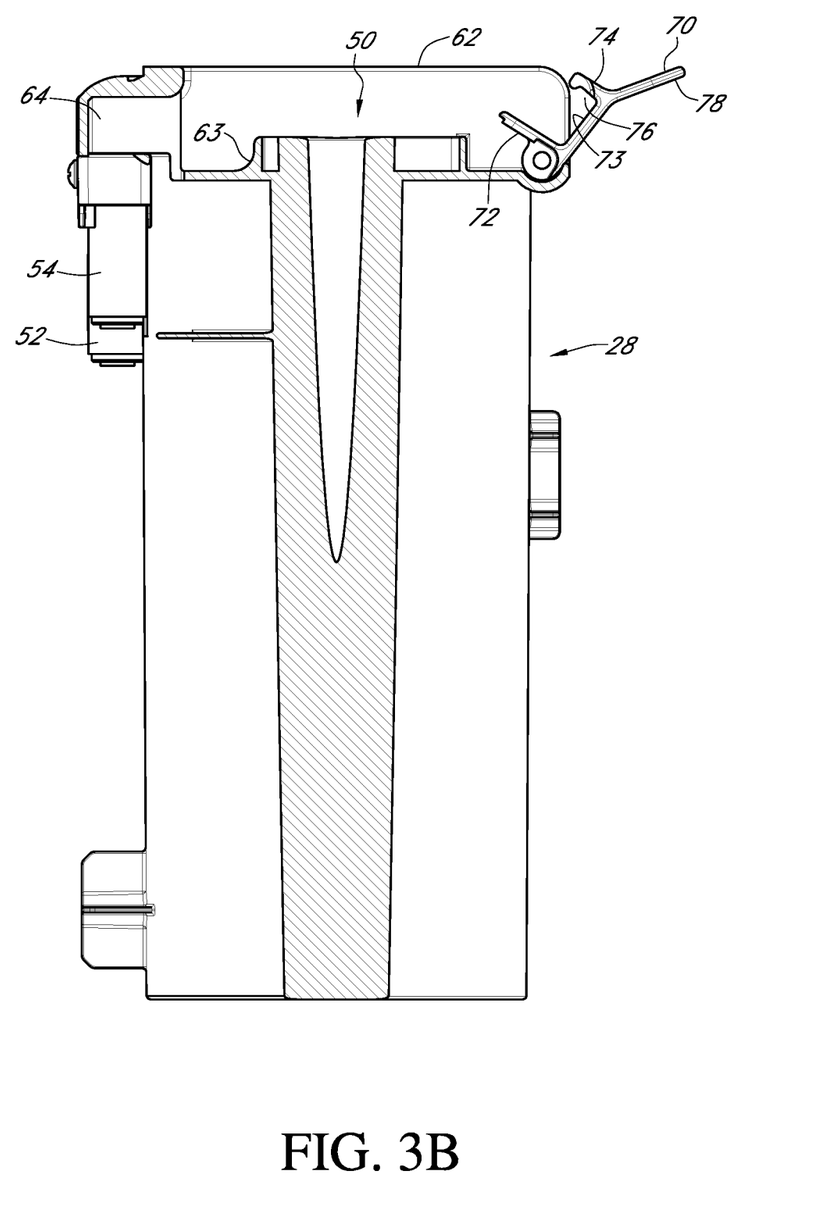
FIG. 3B is a sectional view of the filtration rack along section line 3B-3B of FIG. 2B depicting a right side view of an embodiment of the filter cartridge housing of the present invention.
Figure 4B:
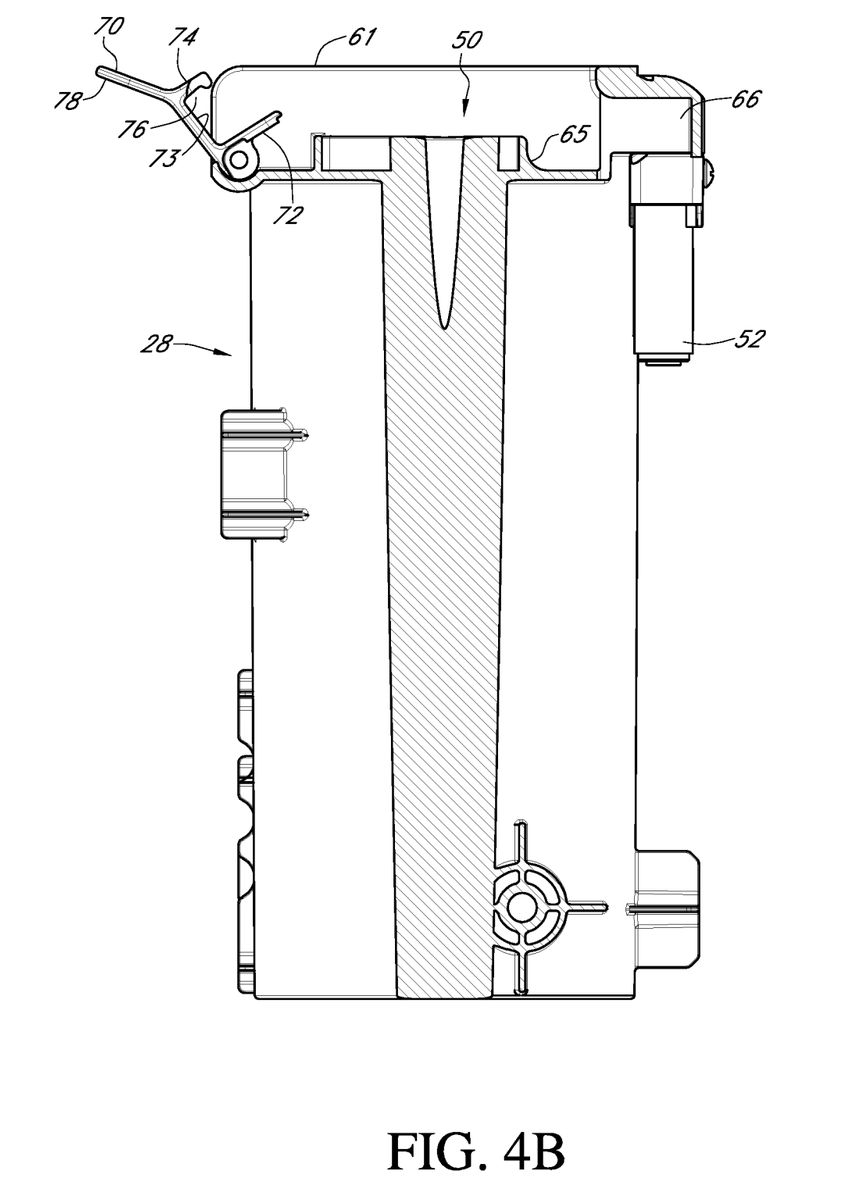
FIG. 4B is a sectional view of the filtration rack along section line 4B-4B of FIG. 2B depicting a left side view of an embodiment of the filter cartridge housing of the present invention.

FIGS. 3B, 4B depict an embodiment of a filter cartridge housing 28 of the present invention. In this embodiment, the filter cartridge housing 28 has cavities and openings formed therein; specifically, a cavity 50 for receiving the replaceable filter cartridge 26; a pair of openings 52 for receiving the inlet ports 34 of the replaceable filter cartridge 26 and a pair of openings 54 for receiving the pair of outlet ports 36 of the replaceable filter cartridge 26. The filter cartridge housing 28 also includes a pair of top sidewalls 60, 62 (FIGS. 2A, 2B) along the top of the filter cartridge housing 28. (In FIGS. 2A, 2B, the filter cartridge housings 28a, 28b, share a common top sidewall 61, which has the features of a sidewall 62a and a sidewall 60b if the filter cartridge housings 28a, 28b were separate, stand-alone filter cartridge housings 28.) In this embodiment, each top sidewall 60, 62 has a locking notch 64, 66 formed therein, and each locking notch 64, 66 has a respective opening 63, 65 formed with it. It should be understood that the number of locking notches 64, 66, typically, match the number of extension portions 46, 48 of the handle 32. The filter cartridge housing 28 of this embodiment also includes a locking latch 70 that is rotatably connected to the pair of top sidewalls 60, 62. The locking latch 70, in this embodiment, includes a bottom arm 72 and a shorter top arm 74 that, in combination with a back wall 73, define an opening 76 that has an opening width substantially equal to the width of the first portion 45 of the handle 32. The locking latch 70 also includes a release handle 78. The locking latch 70, in this embodiment, when not in a locked position, is maintained in an open, unlocked position by a leaf spring (not shown).

Figure 5:
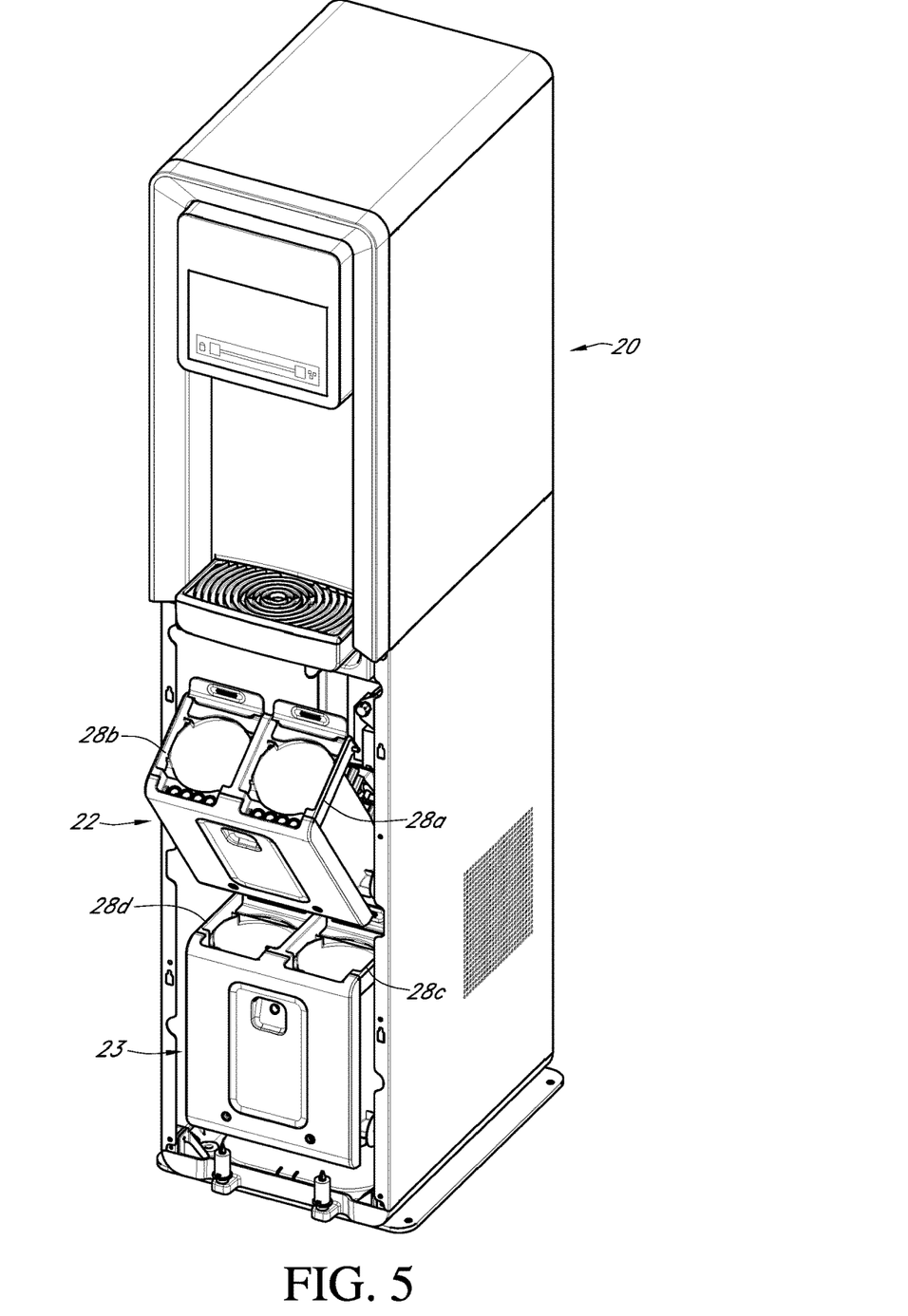
FIG. 5 is a front perspective view of a water dispenser depicting an embodiment of several filter cartridge housings of the present invention without replaceable cartridge filter cartridges installed.
Figure 6:
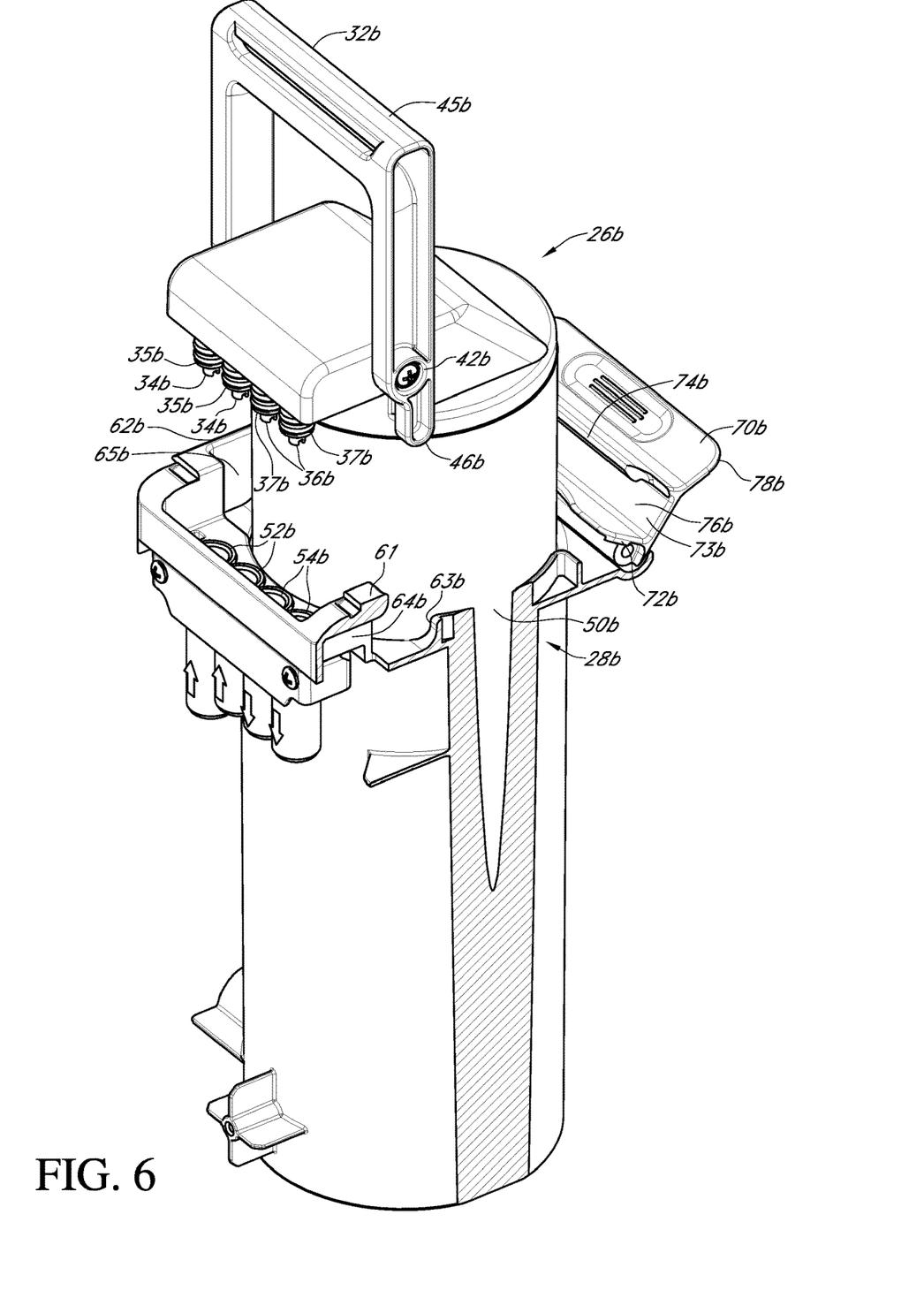
FIG. 6 is perspective view depicting a first stage of inserting a replaceable filter cartridge into a filter cartridge housing.
Figure 7:
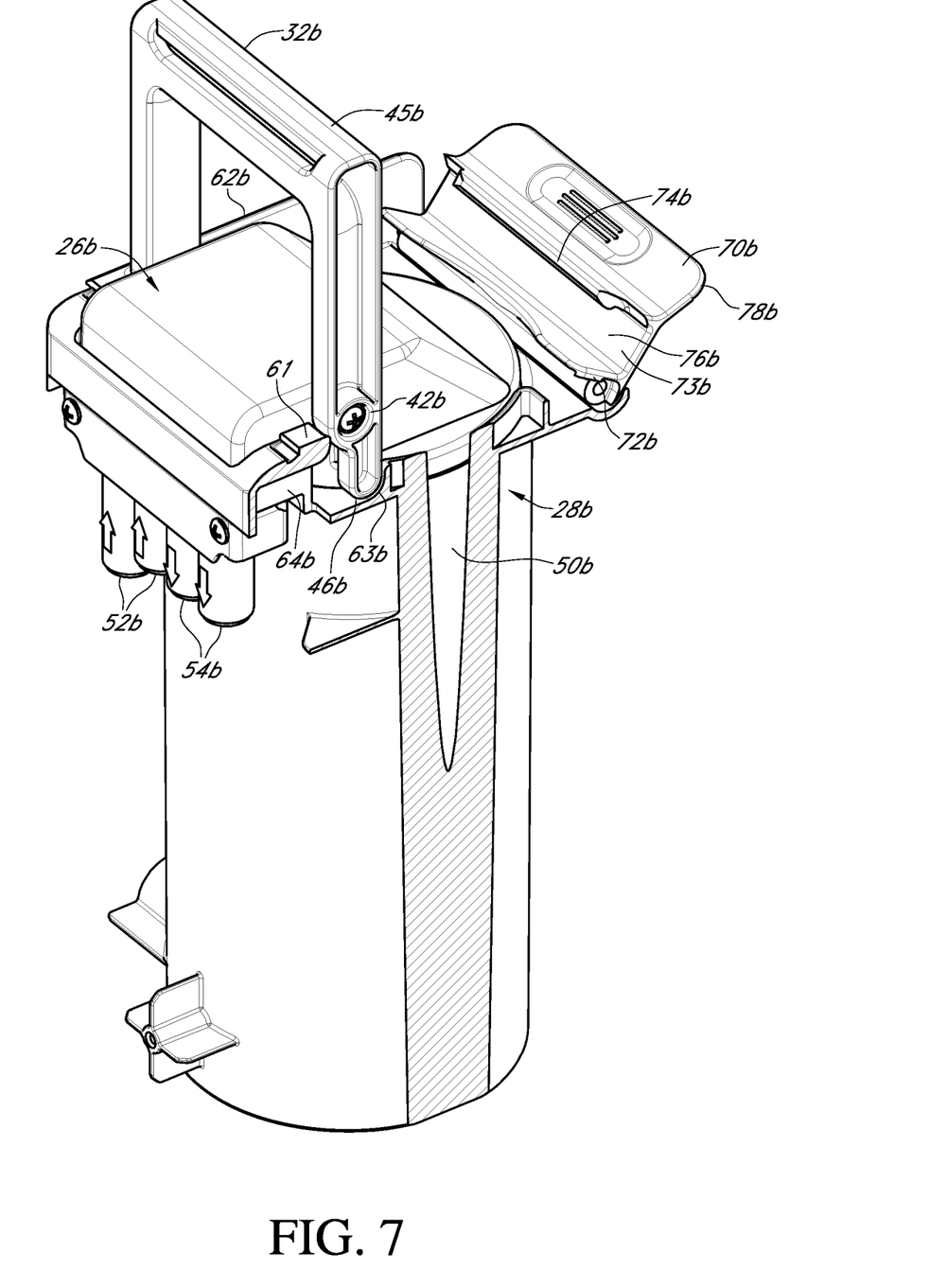
FIG. 7 is perspective view depicting a second stage of inserting a replaceable filter cartridge into a filter cartridge housing.

Referring now to FIG. 5, in this illustration, all of the filter cartridge housings 28a, 28b, 28c, 28d are empty and do not have replaceable filter cartridges 26a, 26b, 26c, 26d installed in them yet. In order to install replaceable filter cartridges 26a, 26b into the filter cartridge housings 28a, 28b, a technician or user, in this embodiment, rotates the filtration rack 22 forward to give him easier access to the filter cartridge housings 28a, 28b. The technician or user then grabs the first replaceable cartridge filter 26 to be installed by the handle 32 and lines up the first replaceable filter cartridge 26 with its corresponding filter cartridge housing 28. Referring to FIG. 6, in the exemplary embodiment depicted, the technician is installing replaceable filter cartridge 26b into filter cartridge housing 28b. After lining up the replaceable filter cartridge 26b with filter cartridge housing 28b, the technician or user then pushes the replaceable filter cartridge 26b into the cavity 50b of the filter cartridge housing 28b. As the technician or user pushes the replaceable filter cartridge 26b downward, the locking extension portions 46b, 48b (FIG. 4A) each contact the openings 63b, 65b of the corresponding notches 64b, 66b (FIG. 4B) formed in the top sidewalls 62b, 61 (FIG. 7).

Figure 8:
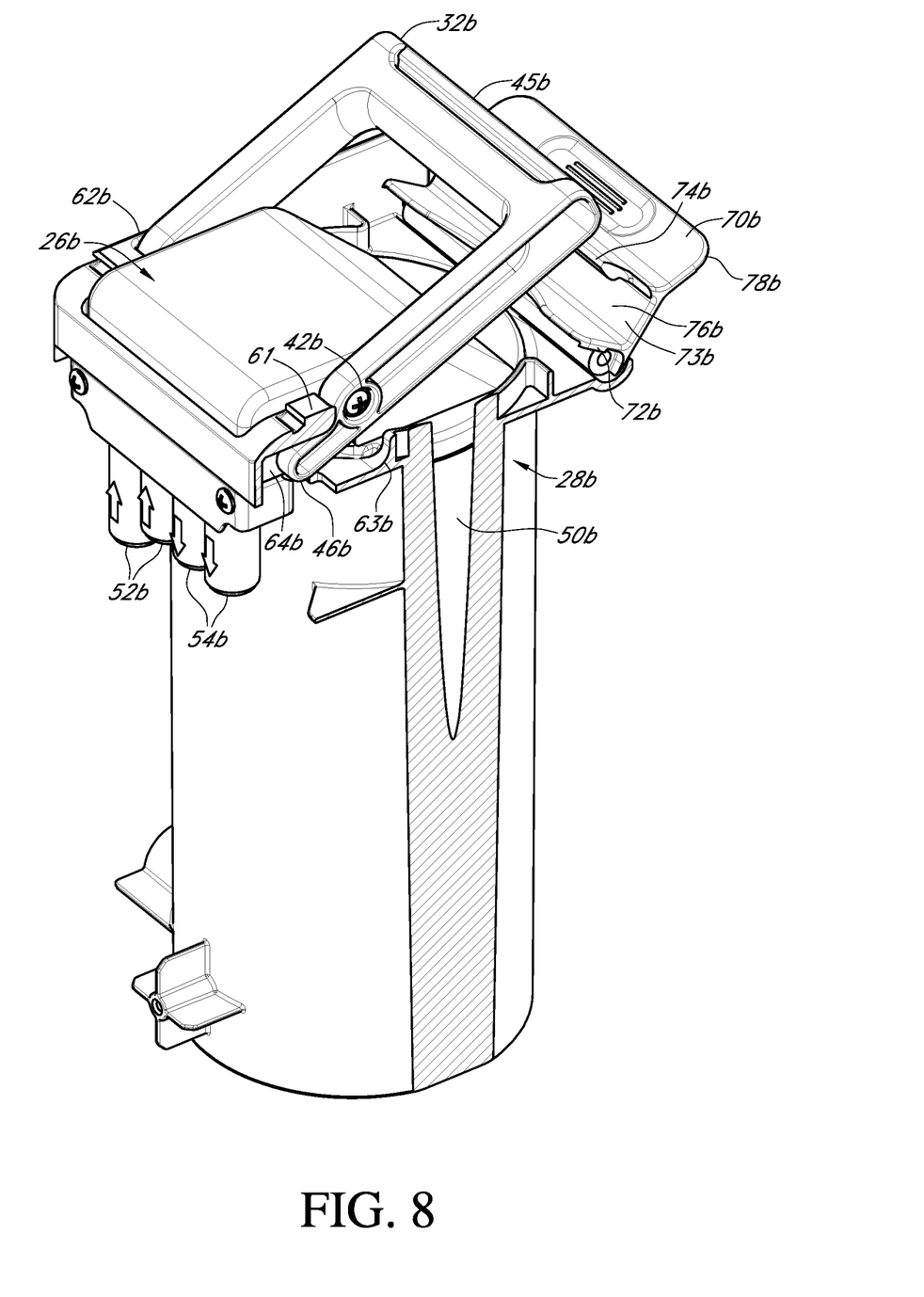
FIG. 8 is perspective view depicting a third stage of inserting a replaceable filter cartridge into a filter cartridge housing.

With the locking extension portions 46b, 48b now in contact with the corresponding openings 63b, 65b of notches 64b, 66b, as illustrated in FIG. 8, the technician or user rotates the first portion 45b of the handle 32b forward and downward around the pivot connectors 42b, 44b. As the first portion 45b of the handle 32b rotates downward in this fashion, the locking extension portions 46b, 48b continue to further engage the corresponding notches 64b, 66b. The engagement of the locking extension portions 46b, 48b with the notches 64b, 66b makes the replaceable filter cartridge 26b self-align with the filter cartridge housing 28b, causing the inlet ports 34b and seals 35b to properly align with the opening 52b and causing the outlet ports 36b and their seals 37b to properly align with each corresponding opening 54b. Because the components of the replaceable filter cartridge 26b self-align with the components of the filter cartridge housing 28b, the technician or user does not need to worry about misalignment which might cause the components to seal improperly or require the technician or user to force a cartridge cover down over the cartridge.

Figure 9A:
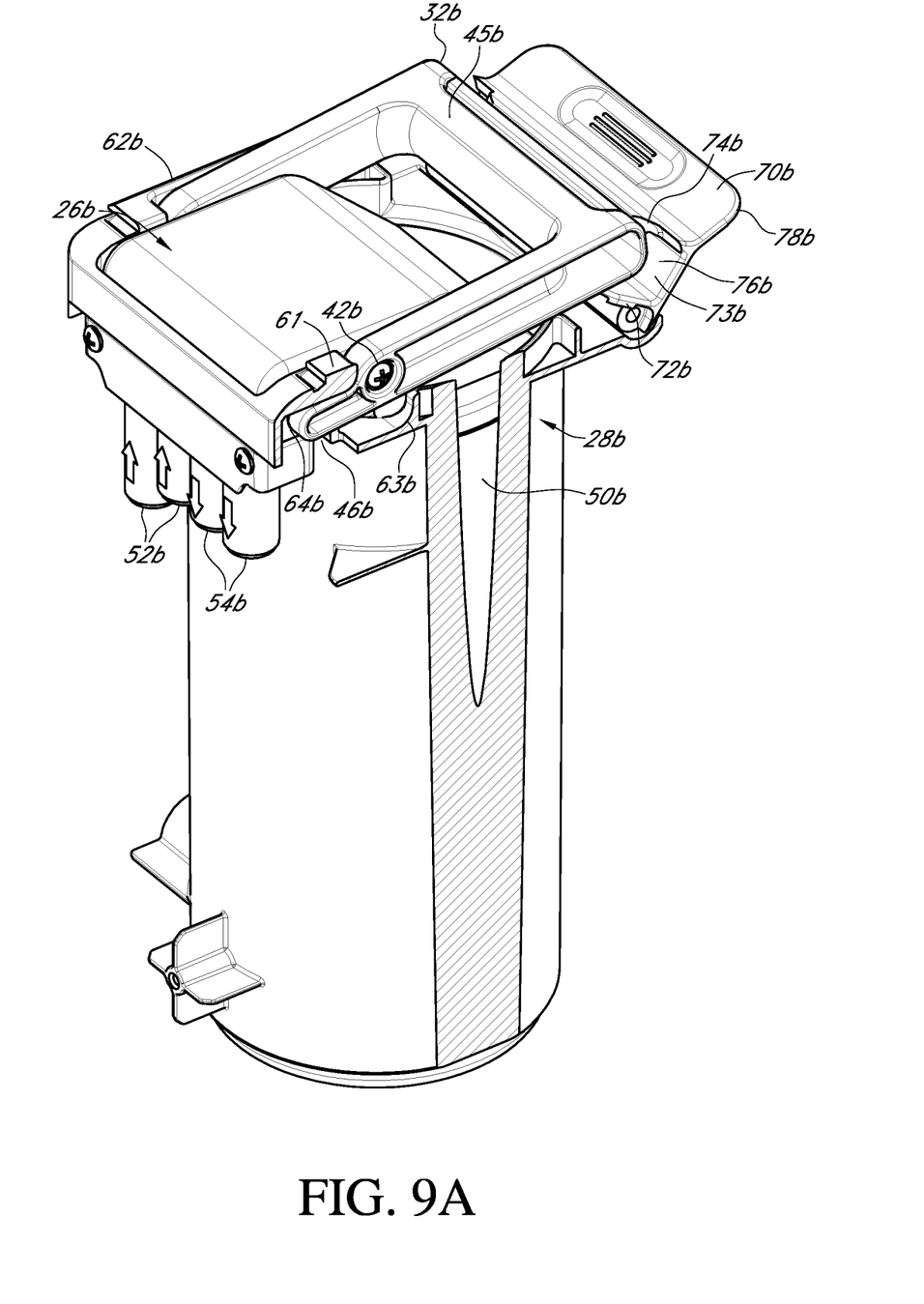
FIG. 9A is perspective view of a replaceable cartridge filtration assembly of the present invention depicting the interaction between a handle and a locking latch of the present invention.
Figure 9B:
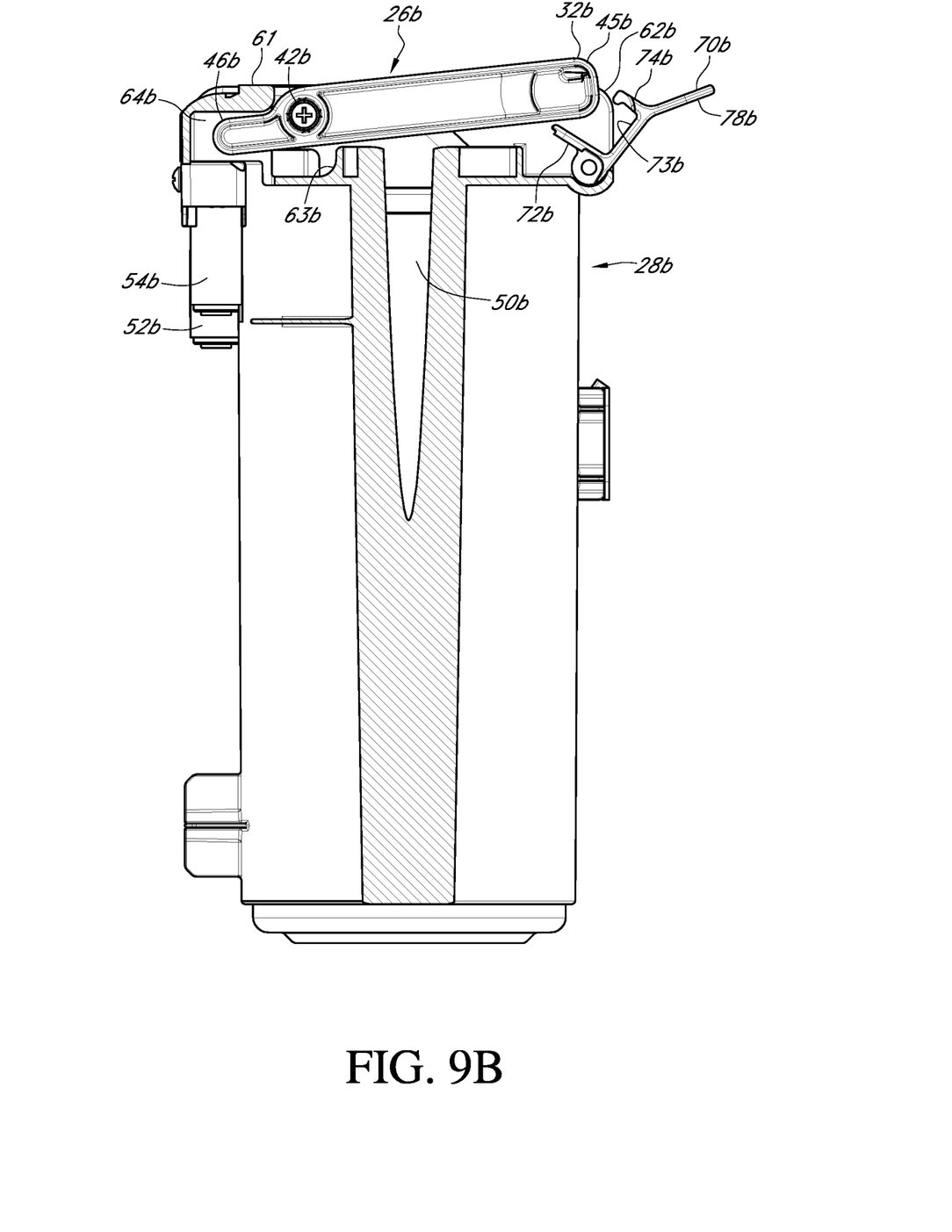
FIG. 9B is side view of a replaceable cartridge filtration assembly of the present invention depicting the interaction between a handle and a locking latch of the present invention.
Figure 10A:
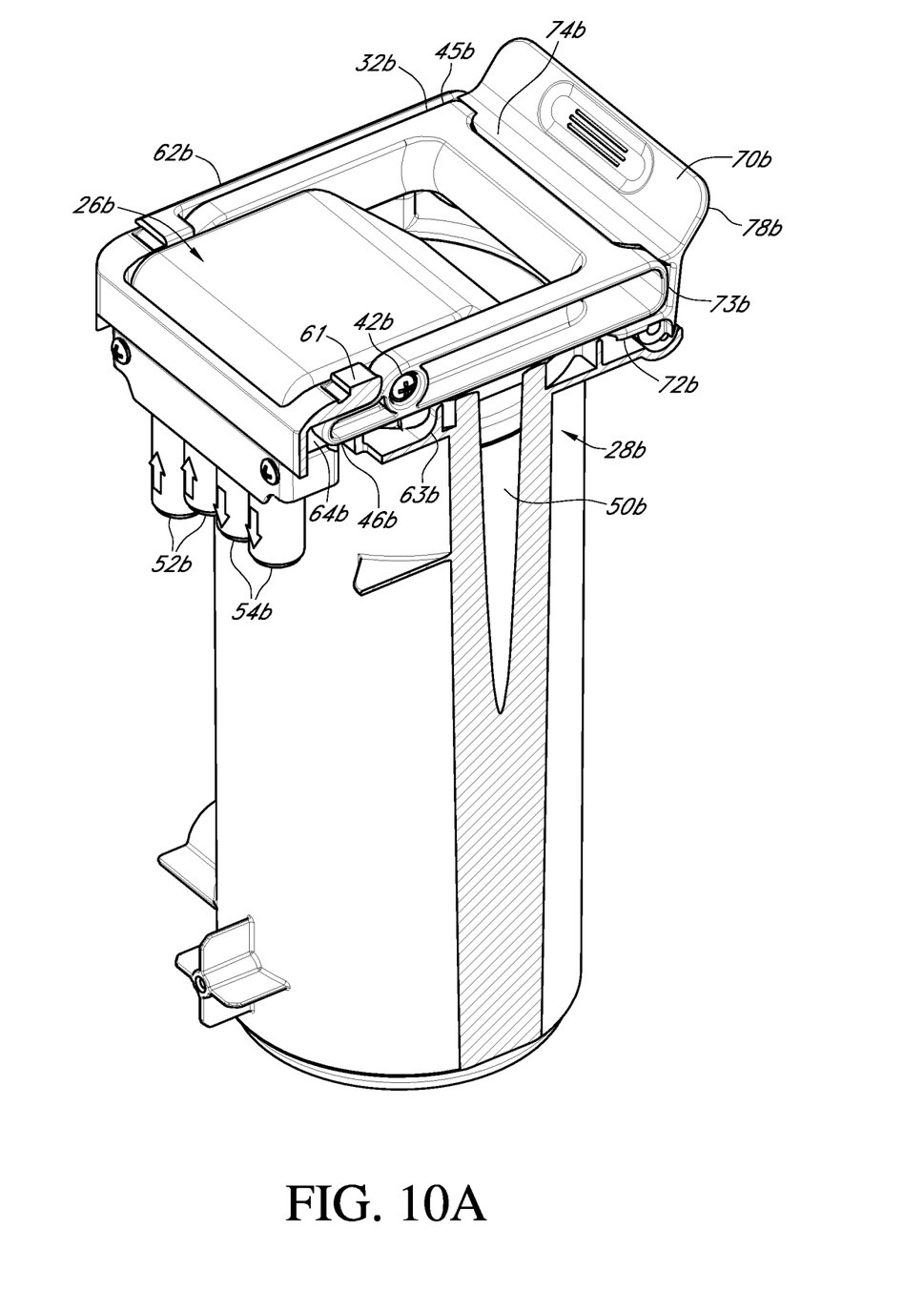
FIG. 10A is a perspective view of a replaceable cartridge filtration assembly of the present invention with a locking latch of the present invention in a locked position.
Figure 10B:
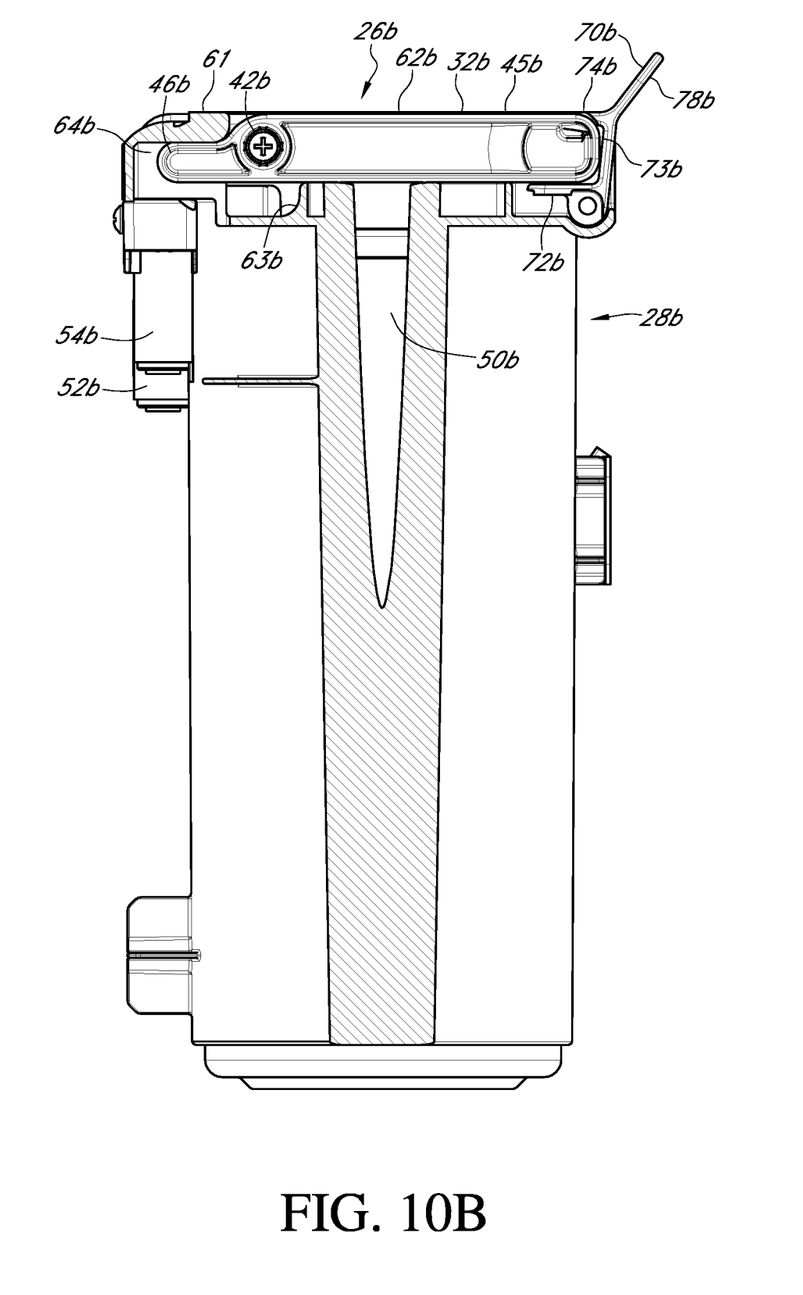
FIG. 10B is side view of a replaceable cartridge filtration assembly of the present invention with a locking latch of the present invention in a locked position.

With the locking extension portions 46b, 48b now engaged with the notches 64b, 66b, as illustrated in FIGS. 9A, 9B, the technician or user continues to rotate the first portion 45b of the handle 32b downward until the first portion 45b of the handle 32b engages the bottom arm 72b of the locking latch 70b. As the technician or user continues to push down on the handle 32b, the first portion 45b of the handle 32b pushes down on the bottom arm 72b of the locking latch 70b rotating the back wall 73b and the top arm 74b towards the handle 32b. As this motion continues, the first portion 45b of the handle 32b fits into the opening 76b, and the top arm 74b of the locking latch 70b engages the top of the first portion 45b of the handle 32b; locking the handle 32b, and the replaceable filter cartridge 26b, into filter cartridge housing 28b (FIGS. 10A, 10B).

Referring again to FIG. 5, the technician or user next installs the replaceable filter cartridge 26a into filter cartridge housing 28a in the same way as described above for installing replaceable filter cartridge 26b. Once the replaceable filter cartridge 26a is installed, the technician or user can then rotate the filtration rack 22 back into the closed position, and then rotate the filtration rack 23 outward to an open position to install the replaceable filter cartridges 26c, 26d in the same manner as the other replaceable filter cartridges 26a, 26b. Once the replaceable filter cartridges 26a, 26b, 26c, 26d are installed to form the replaceable cartridge filtration assemblies 24a, 24b, 24c, 24d and the filtration racks 22, 23 are in the closed position, the technician or user can replace the filter access door and put the water dispenser 20 into operation.

When the replaceable filter cartridge filters 26a, 26b, 26c, 26d need to be replaced, the technician or user removes the replaceable filter cartridge filters 26a, 26b, 26c, 26d in the opposite manner from how they were installed. The technician or user removes the filter access door and tilts the filtration racks 22, 23 as necessary. By way of example, referring to FIG. 10B, with the filtration rack 22 rotated forward, the technician or user pulls the release handle 78b outward away from the handle 32b. This movement causes the bottom arm 72b of the locking latch 70b to push up on the first portion 45b of the handle 32b; causing the first portion 45b of the handle 32b to separate from the locking latch 70b as the release handle 78b continues to rotate outward. With the first portion 45b of the handle 32b separated from the locking latch 70b, the technician or user can grab the handle 32b and continue to rotate the handle 32b upward. As the first portion 45b of the handle 32b rotates upwards in this manner, the locking extension portions 46b, 48b disengage from the corresponding notches 64b, 66b. Once the locking extension portions 46b, 48b are fully disengaged from the corresponding notches 64b, 66b, the technician or user can pull the replaceable filter cartridge 26b out of the filter cartridge housing 28b; disengaging the seals 35b from the openings 52b and disengaging the seals 37b from their corresponding openings 54b. With the replaceable filter cartridge 26b fully removed from the filter cartridge housing 28b, the filter cartridge housing 28b is now ready to have a new replaceable filter cartridge 26b installed within it.

Although certain embodiments and features of a replaceable cartridge filtration assembly have been described herein, the scope of coverage of this patent is not limited thereto. On the contrary, this patent covers all embodiments of the teachings of the disclosure that fairly fall within the scope of permissible equivalents.

What is claimed is:

1. A replaceable cartridge filter assembly of a fluid dispenser, comprising:
   a replaceable filter cartridge having:
      a filter housing;
      a pair of pivot connectors;
      a rotatable handle having at least one locking extension formed in an end of the rotatable handle, and the rotatable handle being connected to the filter housing by the pair of pivot connectors, wherein the rotatable handle has a first portion disposed on one side of the pair of pivot connectors; wherein the at least one locking extension is formed integral with an end of the rotatable handle disposed on an opposite side of one of the pair of pivot connectors;
   a filter cartridge housing defining a cavity having:
      a pair of sidewalls wherein a locking notch is formed in at least one of the pair sidewalls;
      a handle locking latch connected to the sidewalls opposite the end of the sidewalls where the locking notch is formed; and
   wherein the replaceable cartridge filter assembly has an assembled and an unassembled configuration, wherein, in an assembled configuration, the replaceable filter cartridge sits within the cavity of the filter cartridge housing; the rotatable handle has been rotated to insert the at least one locking extension into the locking notch formed in the at least one of the pair of sidewalls of the filter cartridge housing; and the handle locking latch is engaged with the first portion of the rotatable handle to lock the replaceable filter cartridge into the filter cartridge housing.

2. The replaceable cartridge filter assembly of a fluid dispenser of claim 1, wherein the at least one locking extension is a pair of locking extensions each formed in an end of the rotatable handle.

3. The replaceable cartridge filter assembly of a fluid dispenser of claim 2, wherein a locking notch is formed in each of the pair sidewalls.

4. The replaceable cartridge filter assembly of a fluid dispenser of claim 1, wherein the replaceable filter cartridge further comprises:
   an inlet port; and
   an outlet port.

5. The replaceable cartridge filter assembly of a fluid dispenser of claim 4, wherein the filter cartridge housing further comprises:
   an inlet port; and
   an outlet port, wherein, in the assembled configuration, the inlet port of the replaceable filter cartridge sits within the inlet port of the filter cartridge housing, and the outlet port of the replaceable filter cartridge sits within the outlet port of the filter cartridge housing.

6. The replaceable cartridge filter assembly of a fluid dispenser of claim 1, wherein the replaceable filter cartridge further comprises:
   a pair of inlet ports; and
   a pair of outlet ports.

7. The replaceable cartridge filter assembly of a fluid dispenser of claim 6, wherein the filter cartridge housing further comprises:

a pair of inlet ports; and
a pair of outlet ports, wherein, in the assembled configuration, the pair of inlet ports of the replaceable filter cartridge sit within the pair of inlet ports of the filter cartridge housing, and the pair of outlet ports of the replaceable filter cartridge sit within the pair of outlet ports of the filter cartridge housing.

\* \* \* \* \*